United States Patent [19]

Fujiwara et al.

[11] Patent Number: 4,841,813
[45] Date of Patent: Jun. 27, 1989

[54] OIL PRESSURE CIRCUIT FOR AN AUTOMATIC TRANSMISSION

[75] Inventors: Takuji Fujiwara; Kozo Ishii; Tatsutoshi Mizobe, all of Hiroshima, Japan

[73] Assignee: Mazda Motor Corporation, Hiroshima, Japan

[21] Appl. No.: 187,364

[22] Filed: Apr. 28, 1988

[30] Foreign Application Priority Data

Apr. 28, 1987 [JP] Japan ................................ 62-103298
Apr. 28, 1987 [JP] Japan ................................ 62-103300

[51] Int. Cl.⁴ .......................................... B60K 41/18
[52] U.S. Cl. ..................................................... 74/866
[58] Field of Search ........................................ 74/866

[56] References Cited

U.S. PATENT DOCUMENTS 4,527,448  7/1985  Person et al. ..................... 74/866 X
4,727,773  3/1988  Sumiya et al. .................... 74/866 X
4,742,732  5/1988  Hiramatsu ............................. 74/866

Primary Examiner—Dirk Wright
Attorney, Agent, or Firm—Wegner & Bretschneider

[57] ABSTRACT

The multistage transmission gear mechanism is provided with a first and second coupling means for shifting speed stages, each being of a type operable hydraulically and adapted to allow four speed stages from first to fourth speed stages to be selected in accordance with a combination between a coupled state and an uncoupled state of the first and second coupling means. A third coupling means is further provided for ensuring engine braking.

The second coupling means is engaged or coupled by a first pilot pressure generated by a first solenoid at the second, third and fourth speed stages. The first coupling means is coupled by a second pilot pressure generated by a second solenoid at the third and fourth speed stages. The third coupling means is coupled at the second and third speed stages.

A third solenoid is provided for generating a third pilot pressure which prevails over the first pilot pressure and controls shifting the second coupling means at the third speed stage.

At shifting between the second and third speed stages, the second pilot pressure prevails over the first pilot pressure to being the second coupling means into a state of its shifting being controlled by the third pilot pressure. At this time, shifting the third coupling means is controlled by the first pilot pressure to avoid a temporary engagement of all the three coupling means, thus preventing a transmission shock.

15 Claims, 5 Drawing Sheets

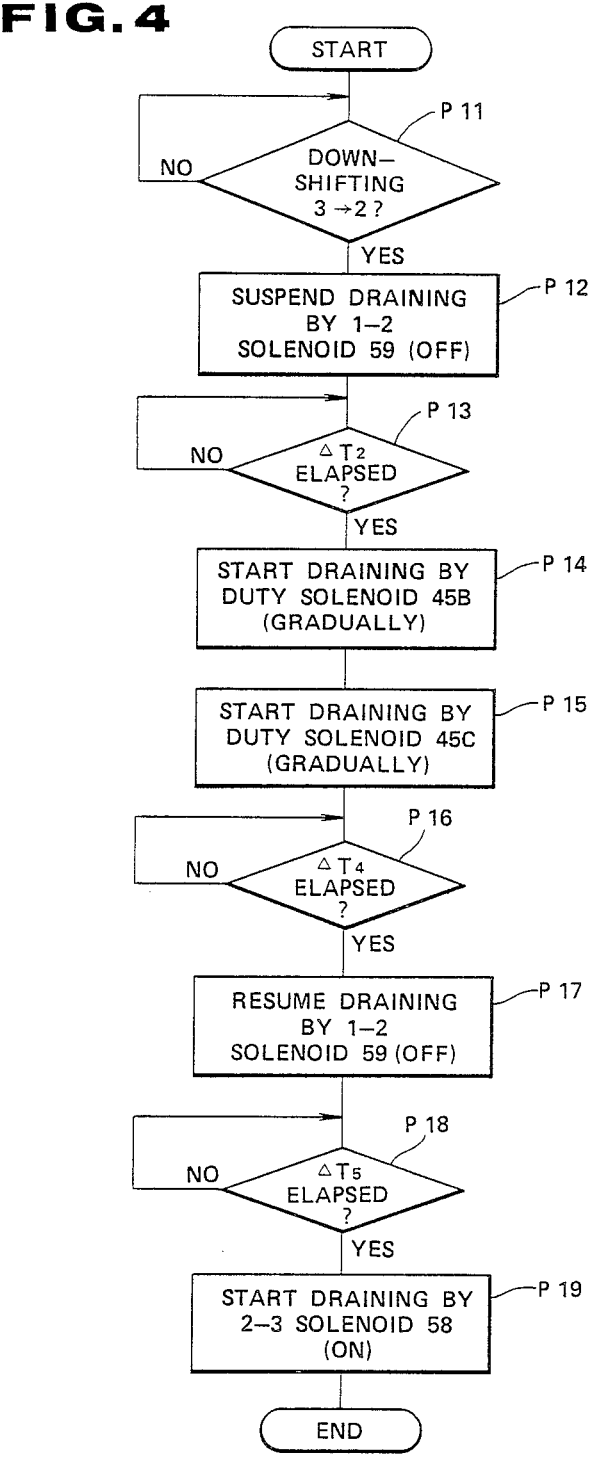

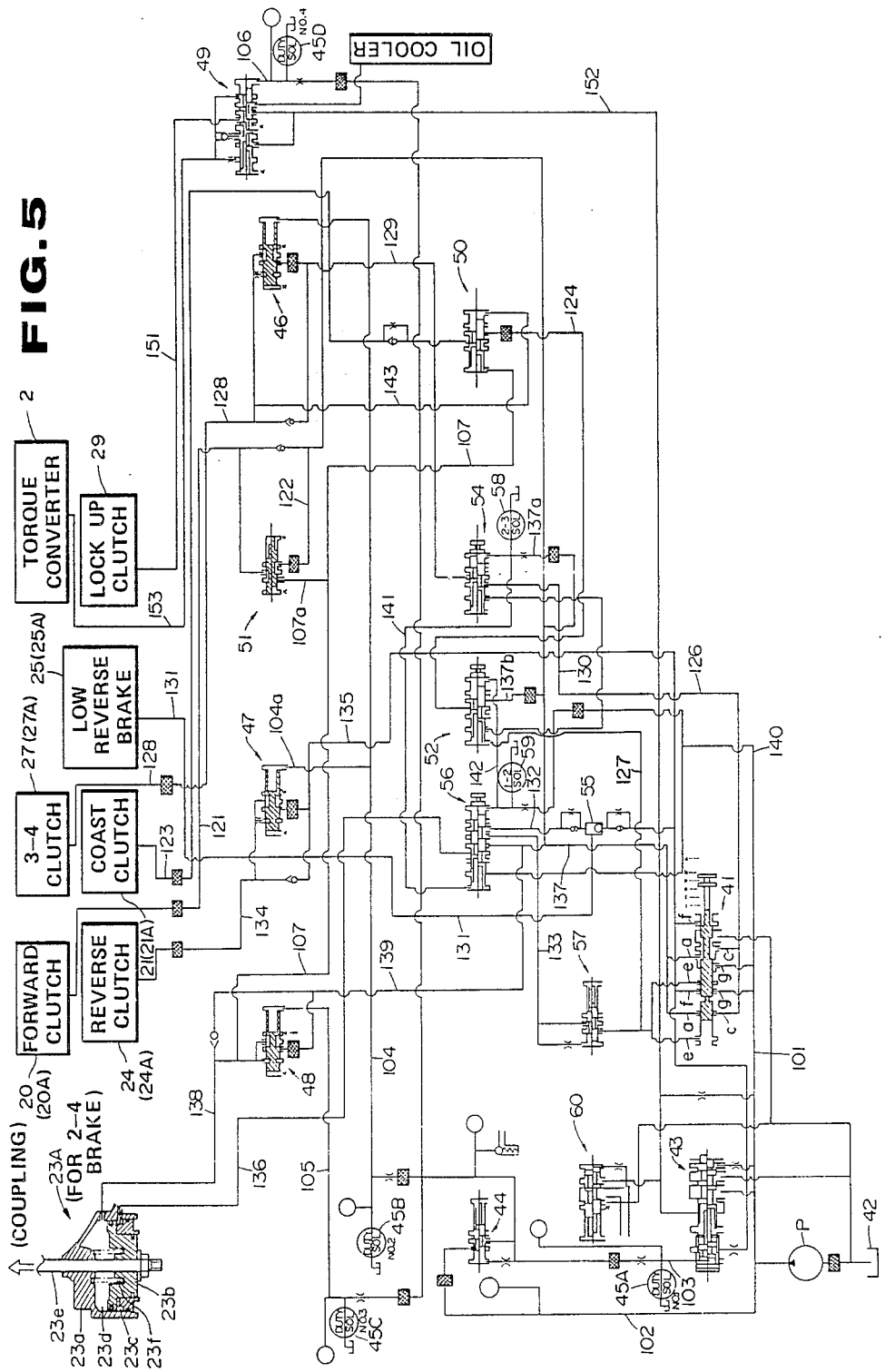

OIL PRESSURE CIRCUIT FOR AN AUTOMATIC TRANSMISSION

BACKGROUND OF THE INVENTION

1. Field of the Invention

The present invention relates to an oil pressure circuit for an automatic transmission.

2. Description of Related Art

Automatic transmissions are designed such that a power transmission system of a multistage transmission of a planetary geartrain type is controlled, that is, its speed stages are shifted, by switching coupled or engaged states of transmission coupling or engaging friction elements such as clutches, brakes and so on.

The friction elements for shifting speed stages of an automatic transmission are operated by hydraulic actuators. Oil pressures are supplied or released to or from the hydraulic actuators through oil pressure circuits provided in the automatic transmission. The oil pressure circuits contains at least plural shift valves such as a 1-2 shift valve and a 2-3 shift valve, and the shift valves are shifted by pilot pressures. Recently, many automatic transmissions are designed such that shifting speed stages is controlled by electronically regulating the pilot pressure for the shift valves by means of solenoids. Japanese Patent Publication (Kokai) No. 92,351/1986 discloses a control system in which such a solenoid is provided each for the shift valves.

Japanese Patent Publication No. 18,780/1987 discloses another oil pressure control system of an automatic transmission in which solenoids are incorporated into the oil pressure control circuit system, enabling an electronic control of shifting speed stages. This system is such that a multistage transmission gear mechanism is provided with first and second coupling means (friction coupling elements) which provides four speed stages from first to fourth speed stages in accordance with a combination of engagement and disengagement of the first and second coupling means.

In this transmission gear mechanism, a first shift valve is provided to alternatively select a supply or a suspension of the supply of an operating oil for coupling the second coupling means and the first shift valve in turn is shifted by means of first pilot pressure generated by a first solenoid that is arranged to generate the first pilot pressure in such a manner that the second coupling means is brought into engagement at second, third and third speed stages and into disengagement at first speed stage. A supply or a suspension of the supply of an operating oil for coupling the first coupling means is shifted by a second shift valve. Shifting of the second shift valve is effected by second pilot pressure generated by a second solenoid which in turn generates the second pilot pressure so as to engage the first coupling means at third and fourth speed stages and to disengage it at first and second speed stages.

In this prior art transmission gear mechanism, a third solenoid is additionally provided which can generate a pilot pressure at third speed stage in a manner to prevail over the first pilot pressure and consequently act on the second coupling means for releasing the disengagement of the second coupling means. Accordingly, at the third speed stage, the disengagement of the second coupling means can be actually released even if the first solenoid would generate a pilot pressure which acts for engagement of the second coupling means.

In addition to the first and second coupling means, a third coupling means is further provided so as to permit a transmission of a torque in a reverse direction to the input shaft side from the output shaft side of the multistage transmission gear mechanism when the third coupling means is coupled or engaged, thereby ensuring engine braking. Although the third coupling means is designed so as to be engaged at any arbitrary speed stage, it is impossible to have the third coupling means engaged at all of the four speed stages because, if it were engaged at all of the first, second and third coupling means, the multistage transmission gear mechanism causes a so-called "internal lock", whereby no power can be transmitted. More specifically, the transmission gear mechanism as disclosed in this published Japanese patent application is designed such that the third coupling means is disengaged at fourth speed stage when the first and second coupling means are both engaged and it is engaged at the first, second, and third speed stages. In order to engage or disengage the third coupling means, it can be conceived that a fourth solenoid is additionally provided for controlling the third coupling means. However, such a fourth solenoid makes a structure of the oil pressure circuit more complex and expensive.

When the speed stage is shifted between the second and third speed stages where coupling the third coupling means is effected, a deviation in timings of switching the first and second coupling means gives rise to a temporary state of the fourth speed stage where an internal lock is caused, whereby a shock is likely to occur at the time of shifting the speed stages. More specifically, given an uncoupled state of the first coupling means and a coupled state of the second coupling means at the second speed stage as well as a coupled state of the first coupling means and an uncoupled state of the second coupling means at the third speed stage, on the one hand, if a timing of engaging or coupling the first coupling means would be earlier than a timing of releasing the coupling of or disengaging the second coupling means at the time of upshifting from the second to the third speed stages, there can be temporarily caused a situation in which the first and second coupling means are both in a coupled state, that is, in a state in which the speed stage is at fourth speed stage. Given the above, on the other hand, there can be likewise caused a situation in which a state of the fourth speed stage is temporarily caused if a timing of engaging the second coupling means would be earlier than a timing of disengaging the first coupling means at the time of downshifting from the third speed stage to the second speed stage.

The transmission gear mechanism having substantially the same apparatus structure as shown in FIG. 1 of this application is disclosed in pending U.S. Patent Application Ser. No. 926,840 filed Nov. 3, 1986 based on U.S. Ser. No. 665,044 filed Oct. 26, 1984 claiming Japanese Patent Application No. 202,042/1983 published as Publication (kokai) No. 95,236/1985. U.S. Pat. No. 4,665,774 issued May 19, 1987 based on U.S. Patent Application Ser. No. 746,071 filed June 18, 1985 claiming Japanese Patent Application No. 128,026/1984 published as Publication (kokai) No. 6,451/1986, pending U.S. Patent Application Ser. No. 31,612 filed Mar. 30, 1987 claiming Japanese Patent Application No. 75,697/1986 published as Publication (kokai) No. 233,547/1987, and pending U.S. Patent Application Ser. No. 32,611 filed Mar. 31, 1987 claiming Japanese Patent Application No. 77,090/1986 published as Publication (kokai) No. 233,551/1987, all of which are assigned to Mazda Motor Corporation.

SUMMARY OF THE INVENTION

The present invention has the first object to provide an oil pressure circuit of an automatic transmission so as to cause no transmission shock at the time of shifting between the second and third speed stages where engine braking is ensured in each case by using a third coupling means.

The present invention further has the second object to provide an oil pressure circuit of an automatic transmission in which switching the third coupling means is controlled by effectively utilizing a solenoid provided for controlling a first and second coupling means in order to prevent a transmission shock likely to be caused at the time of shifting between the second and third speed stages.

In order to achieve the above objects, the present invention consists of an oil pressure circuit of an automatic transmission comprising:

a multistage transmission gear mechanism having a shifting speed stage representing a ratio of rotation of an output shaft to rotation of an input shaft, said shifting stage being adapted to provide at least four speed stages from first speed stage to fourth speed stage;

a first coupling means and a second coupling means being each of a type operable hydraulically and being adapted to shift a power transmission passage of said multistage transmission gear mechanism, said first coupling means being arranged so as to be shifted between a coupled or engaged state and an uncoupled or disengaged state between first and second speed stages and third and fourth speed stages, said second coupling means being arranged so as to be shifted between a coupled or engaged state and an uncoupled or engaged state between first and third speed stages and second and fourth speed stages, and said four speed stages being alternatively selected in accordance with a combination of the coupled state and the uncoupled state of said first and second coupling means;

a third coupling means being of a type operable hydraulically and capable of transmitting a torque in a reverse direction toward the side of said input shaft from the side of said output shaft at least at second and third speed stages;

a first actuator containing a first solenoid adapted to generate a first pilot pressure shifting a state between the first speed stage and the second, third and fourth speed stages, said first actuator being adapted to regulate a supply of operating oil pressure to said second coupling means in accordance with a state in which said first pilot pressure is generated;

a second actuator containing a second solenoid adapted to generate a second pilot pressure shifting a state between the first and second speed stages and the third and fourth speed stages, said second actuator being adapted to regulate a supply of operating oil pressure to said first coupling means in accordance with a state in which said second pilot pressure is generated;

a third actuator containing a third solenoid adapted to generate a third pilot pressure, said third actuator adapted to allow said third pilot pressure to cancel a regulation of said second coupling means by said first actuator at third speed stage; and at the time of shifting between second and third speed stages, said second pilot pressure being set to act on said first actuator and prevail over said first pilot pressure so as to retain and fix said first actuator in a state at second, third and fourth speed stages and said first pilot pressure being adapted so as to regulate shifting said third coupling means.

With this arrangement, the present invention permits the first actuator as the second coupling means to be forcibly retained in a state of being fixed at the second, third and fourth speed stages while coupling and releasing the coupling of the second coupling means are effected using the third actuator. Accordingly, the speed stages are shifted between the second and third speed stages can be effected in such a manner that the third coupling means is temporarily brought by means of the first pilot pressure into a state where no internal lock is caused. Of course, the third coupling means can be engaged again after the first and second coupling means were switched to a predetermined state after the speed stage has been shifted, thus ensuring engine braking.

In accordance with the present invention, the coupling or engagement and the uncoupling or disengagement of the third coupling means at the time of shifting between the second and third speed stages can be controlled using the solenoid each for the first and second coupling means. This arrangement has the advantage that a additional disposition of a solenoid for exclusive use for controlling the switching of the third coupling menas can be avoided.

BRIEF DESCRIPTION OF THE DRAWINGS

FIGS. 3 and 4 are each a flow chart illustrating an example of preferred embodiments of a transmission control.

FIG. 5 is a circuit view illustrating a variant of oil pressure circuits according to the present invention.

DETAILED DESCRIPTION OF THE PREFERRED EMBODIMENTS

The present invention will be described more in detail in conjunction with the drawings attached hereto.

BASIC STRUCTURE OF AN AUTOMATIC TRANSMISSION

Figure 1:
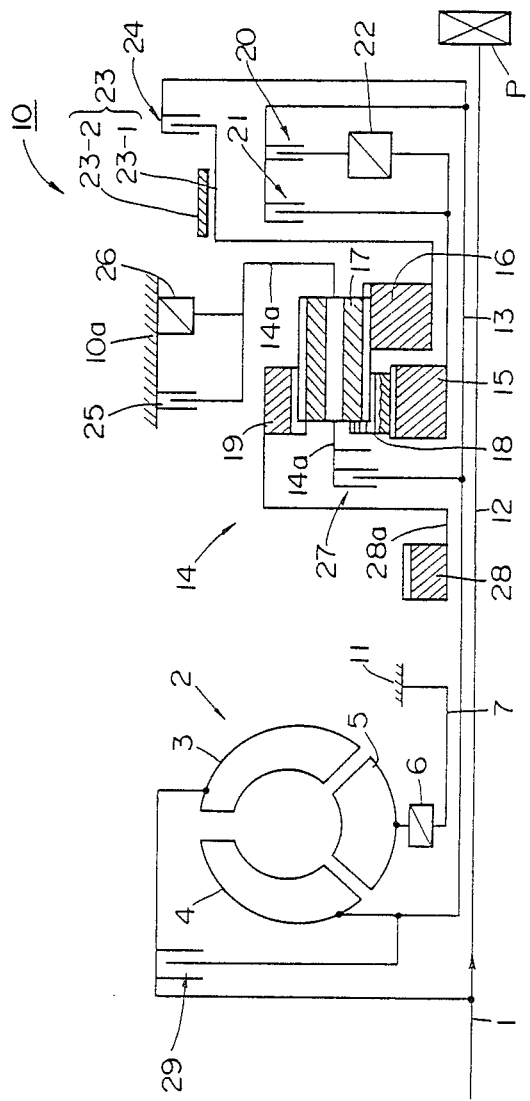
FIG. 1 is a schematic view illustrating one embodiment of a transmission gear mechanism.

FIG. 1 is a schematic skelton structural view of an automatic transmission incorporating an oil pressure control apparatus according to the present invention.

Referring to FIG. 1, reference numeral 1 denotes a crank shaft of an engine (not shown), which functions as an input shaft. Coaxially with the crank shaft 1 are disposed a torque converter 2 and a multistage transmission geartrain apparatus 10 in this order from the engine side. The torque converter 2 comprises a pump 3, a turbine 4 and a stator 5. The pump 3 is fixed to the crank shaft 1, and the stator 5 is mounted to rotate on a fixed shaft 7 integral with a casing 11 for the multistage transmission geartrain apparatus 10 through a one-way clutch 6 which in turn is disposed so as to allow the stator 5 to rotate only in the same direction as the pump 3.

The multistage transmission geartrain apparatus 10 is provided with a center shaft 12 connected to the pump 3, which in turn is arranged such that its base end is fixed to the crank shaft 1 and its tip end penetrates and extends through a center portion of the multistage transmission geartrain apparatus, thus driving an oil pump P mounted on a side wall of the geartrain apparatus. Outside the center shaft 12 is mounted a hollow turbine shaft 13 supported rotatably by the side wall thereof, a base end of which is connected to the turbine 4 of the torque converter 2 and a tip end of which extends up to the side wall thereof. Mounted on the turbine shaft 13 is a planetary gear unit 14 which comprises a small-diameter sun gear 15, a large-diameter sun gear 16 disposed at a side of the small-diameter sun gear 15 away from the engine, a long pinion gear 17, a short pinion gear 18, and a ring gear 19.

At a side of the planetary gear unit 14 away from the engine are disposed a forward clutch 20 and a coast clutch 21 in series with each other. The forward clutch 20 is a clutch for forward driving and is to connect or disconnect a power transmission between the small-diameter sun gear 15 and the turbine shaft 13 through a first one-way clutch 22. The coast clutch 21 is to connect or disconnect a power transmission between the small-diameter sun gear 15 and the turbine shaft 13 in series with the forward clutch 20. Outside a radial direction of the coast clutch 21 is disposed a 2-4 brake 23 which is a band brake comprising a brake drum 23-1 connected to the large-diameter sun gear 16 and a brake band 23-2 suspended on the brake drum 23-1. Outside a radial direction of the forward clutch 20 and at a side of the 2-4 brake 23 is a reverse clutch 24 which is a clutch for reverse driving and is to connect or disconnect a power transmission between the large-diameter sun gear 16 and the turbine shaft 13 through the brake drum 23-1 of the 2-4 brake 23.

Outside a radial direction of the planetary gear unit 14 is disposed a low reverse brake 25 engaging or disengaging a carrier 14a for the planetary gear unit 14 with or from a housing case 10a for the multistage transmission geartrain apparatus 10. Between the 2-4 brake 23 and the low reverse brake 25 is disposed a second one-way clutch 26 in series with the low reverse brake 25, which is arranged so as to engage or disengage the carrier 14a for the planetary gear unit 14 with or from the housing case 10a for the multistage transmission geartrain apparatus 10. Disposed at a side of the planetary gear unit 14 close to the engine side is a 3-4 clutch 27 for connecting or disconnecting a power transmission between the carrier 14a therefor and the turbine shaft 13. At a side of the 3-4 clutch 27 close to the engine side is disposed an output gear 28 connected to the ring gear 19. The output gear 28 is mounted on an output shaft 28a.

In FIG. 1, reference numeral 29 denotes a lock-up clutch for connecting the turbine shaft 13 to the crank shaft 1 without a connection to the torque converter 2.

FUNCTIONS OF MULTISTAGE TRANSMISSION GEARTRAIN APPARATUS 10

The multistage transmission geartrain apparatus 10 has four forward drive speed ranges and one rearward drive speed range and is designed to provide a desired speed range by operating the clutches 20, 21, 24 and 27 as well as the brakes 23 and 25 in an appropriate combination. Table 1 below indicates relationships of the speed ranges with operation states of the clutches and brakes.

It is noted here that an actuator for the 2-4 brake 23 only is provided with two oil chambers at its apply side and at its release side and designed so as to couple or engage the 2-4 brake 23 only when an oil pressure is fed to the apply side oil chamber and when an oil pressure in the release side oil chamber is released and to uncouple or disengage the 2-4 brake 23 in the other conditions. The rest of actuators for the clutches and the brakes have each one oil chamber adapted to couple the clutch or brake only when an oil pressure is supplied to the corresponding oil chamber and to uncouple it when the oil pressure is released therefrom.

TABLE 1

| Speed Range Positions | Speed Stages | Clutches | | | | Brakes | | Low Reverse (25) | One-Way Clutch | |
|---|---|---|---|---|---|---|---|---|---|---|
| | | Forward (20) | Coast (21) | 3-4 (27) | Reverse (24) | 2-4 (23) | | | First (22) | Second (26) |
| | | | | | | Apply | Release | | | |
| P | — | | | | | | | | | |
| R | — | | | | ○ | | | ○ | | |
| N | — | | | | | | | | | |
| D | 1st Speed | ○ | | | | | ○ | | ○ | ○ |
| | 2nd Speed | ○ | ○ | | | ○ | | | ○ | |
| | 3rd Speed | ○ | ○ | ○ | | △ | ○ | | ○ | |
| | 4th Speed | ○ | | ○ | | ○ | | | △ | |
| 2 | 1st Speed | ○ | | | | | ○ | | ○ | ○ |
| | 2nd Speed | ○ | ○ | | | ○ | | | ○ | |
| | 3rd Speed | ○ | ○ | ○ | | △ | ○ | | ○ | |
| 1 | 1st Speed | ○ | ○ | | | | ○ | ○ | ○ | |
| | 2nd Speed | ○ | ○ | | | ○ | | | ○ | |

Note:
The symbol ○ marks the state of coupling.
The symbol △ means the state of coupling without involving any power transmission.

OUTLINE OF OIL PRESSURE CIRCUITS

An outline of the oil pressure circuits for the automatic transmission as shown in FIG. 1 will be described in conjunction with FIG. 2.

MANUAL VALVES

Figure 2:
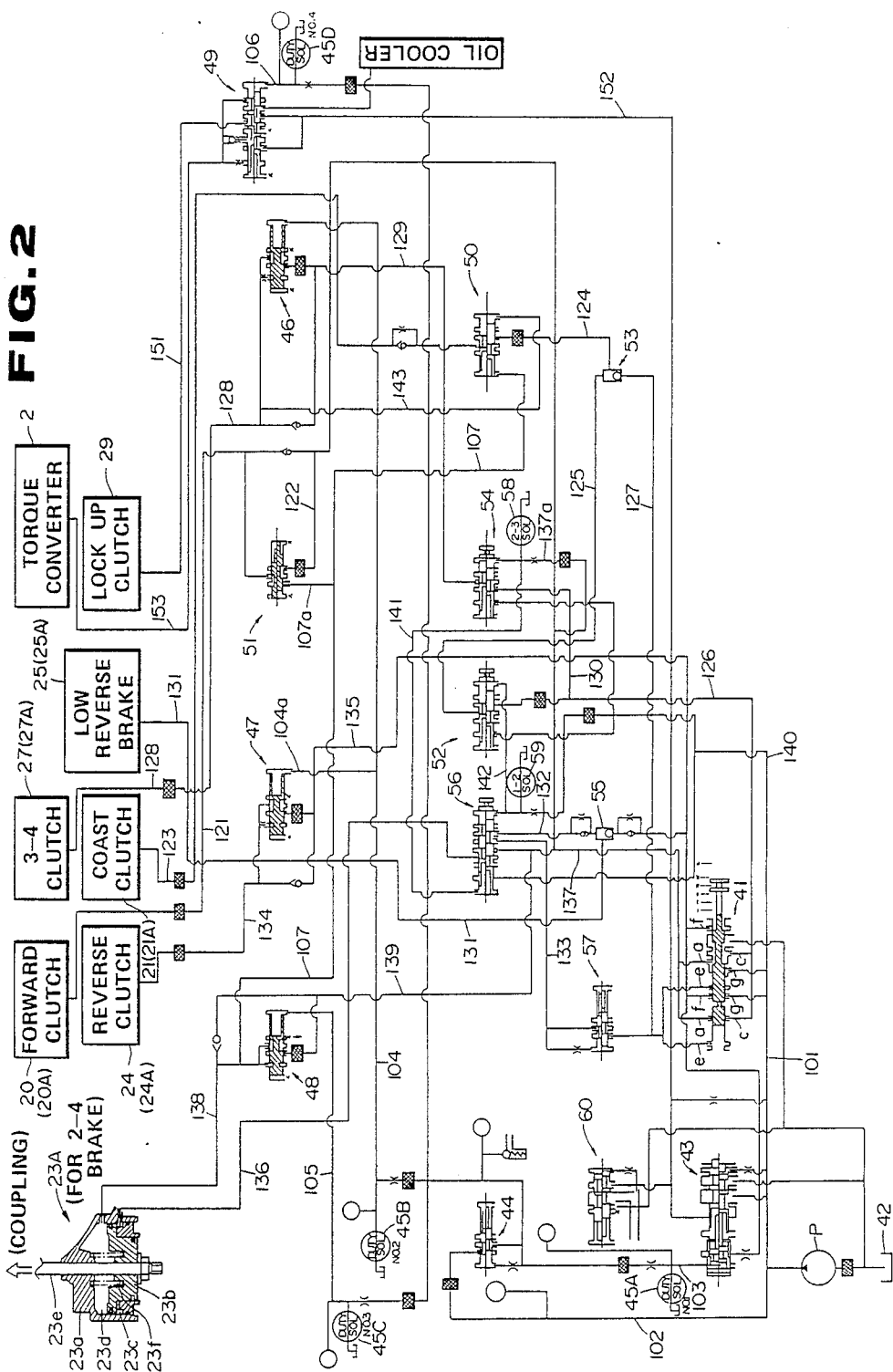
FIG. 2 is a circuit view illustrating one example of oil pressure circuits according to the present invention, to be used for a transmission mechanism.

Referring to FIG. 2, a manual valve 41 is shown to provide six speed range positions "P", "R", "N", "D", "2" and "1" and comprises ports "a", "c", "e", "f", and "g". An oil pressure generated by the oil sucked from an oil reservoir tank 42 by a pump P is regulated by a pressure regulator valve 43 connected to an oil passage 101 and then fed as a line pressure to the ports "g".

When the manual valve 41 provides the speed range position "P", no port is communicated with the ports "g". At the speed range position "R" of the manual valve 41, only the ports "f" are communicated with the ports "f". No ports are communicated with the ports "g" when the manual valve 41 provides the speed range position "N". The ports "a" and "c" are communicated with the ports "g" at the speed range positions "D" and "2" of the manual valve 41 and the ports "a" and "e" are communicated with the ports "g" at the speed range position "1".

DUTY SOLENOID VALVES:

An oil pressure of the oil pumped from the oil reservoir tank 42 by the pump P is reduced to a predetermined pressure through an oil passage 102 by means of a solenoid reducing valve 44. The reduced oil pressure is then regulated by first, second, third and fourth duty solenoid valves 45A, 45B, 45C and 45D, respectively.

The first duty solenoid 45A converts the reduced oil pressure fed from the solenoid reducing valve 44 into a pilot pressure and supplies it to the pressure regulator valve 43 through an oil passage 103. The oil pressure fed from the solenoid reducing valve 44 is regulated by the second duty solenoid valve 45B and then supplied as a pilot pressure to a 3-4 pressure control valve 46 through an oil passage 104 and furthermore to a reverse pressure control valve 47 through an oil passage 104a branched from the oil passage 104. The oil pressure is fed to the third duty solenoid valve 45C and converted thereby into a pilot pressure that in turn is then fed to a servo pressure control valve 48 through an oil passage 105. The oil pressure regulated by the fourth duty solenoid valve 45D is fed as a pilot pressure to a lock-up control valve 49 through an oil passage 106.

The servo pressure control valve 48 is designed so as to regulate the oil pressure at a release side of an acutuator 23A for the 2-4 brake 23 through an oil passage 138 as will be described hereinbelow. The regulated oil pressure is then fed through an oil passage 107 to a coast control valve 50 as a pilot pressure. The duty solenoid valve 45C accordingly involves adjusting both the pilot pressure for the servo pressure control valve 48 and the pilot pressure for the coast control valve 50. The regulated oil pressure at the release side of the actuator 23A is also employed as a forward clutch pressure to be shifted by a forward control valve 51 through a branch oil passage 107a branched from the oil passage 107 in a manner as will be described hereinbelow.

ACTUATORS FOR CLUTCHES AND BRAKES

The actuators for the transmission clutches and the brakes other than the actuator 23A for the 2-4 brake 23 are of the type adapted each to be coupled only when the oil pressure is fed to the corresponding oil chamber. Accordingly, such actuators are indicated in FIG. 2 by the reference numerals provided on the corresponding clutches and brakes.

The actuator 23A for the 2-4 brake 23 comprises a cylinder 23a which in turn is divided by a piston 23b into an apply side oil chamber 23c and a release side oil chamber 23d. The piston 23b is disposed integrally with a piston rod 23e connected to the band brake 23-2 of the 2-4 brake 23. To the cylinder 23a is mounted a spring 23f in such a manner as urging the piston 23b in a downward direction as shown in FIG. 2. The actuator 23A allows the 2-4 brake 23 to be coupled or engaged with the 2-4 brake 23 only when the line pressure is introduced into the apply side oil chamber 23c and the oil pressure of the release side oil chamber 23d is released. In other words, even if the line pressure is fed to the apply side oil chamber 23c, the 2-4 brake 23 is in an uncoupled or disengaged state when the line pressure is introduced into the release side oil chamber 23d. A coupling force of the 2-4 brake 23 is to be adjusted by regulating the oil pressure of the release side oil chamber 23d by the servo pressure control valve 48 using the third duty solenoid valve 45C.

CONNECTION OF ACTUATORS FOR FRICTION COUPLING ELEMENTS WITH MANUAL VALVE 41

As shown in FIG. 2, the actuator 20A for the forward clutch 20 is connected through an oil passage 121 to the forward control valve 51 which in turn is communicated through oil passages 122 and 137 with the ports "a" of the manual valve 41.

The actuator 21A for the coast clutch 21 is connected through an oil passage 123 to the coast control valve 50 which in turn is connected through an oil passage 124 to a shift valve 53. The oil passage 124 is shifted by the shift valve 53 and connected to an oil passage 125 which in turn is connected to a coast exhaust valve 52. This coast exhaust valve is further connected through an oil passage 126 to the ports "c" of the manual valve 41.

The shift valve 53 can also connect the oil passage 124 to an oil passage 127 extending from the ports "e" of the manual valve 41 which in turn is communicated with the coast control valve 50, thus permitting a supply of line pressure to the coast control valve 50.

The actuator 27A for the 3-4 clutch 27 is connected through an oil passage 128 to the 3-4 pressure control valve 46 which in turn is connected through an oil passage 129 to a 2-3 shift valve 54. This 2-3 shift valve is connected to the ports "c" of the manual valve 41 through oil passages 130 and 126.

The actuator 25A for the low reverse brake 25 is connected to the ports "f" of the manual valve 41 through an oil passage 131 via a shift valve 55. The actuator 25A is also connected to the ports "e" thereof via the shift valve 55 which can shift the oil pressure in the oil passage 131 to an oil passage 132. This oil passage 132 is led to a 1-2 shift valve 56 which in turn is connected through an oil passage 133 to the low reducing valve 57. This low reducing valve 57 is then communicated with the ports "e".

The actuator 24A for the reverse clutch is connected through an oil passage 134 to the reverse pressure control valve 47 which in turn is connected to the ports "f" thereof via an oil passage 135.

For the actuator 23A of the 2-4 brake 23, the apply side oil chamber 23c thereof is connected through an oil passage 136 to the 1-2 shift valve 56 and then via the 1-2 shift valve 56 through an oil passage 137 to the ports "a" of the manual valve 41, on the one hand, and the release side oil chamber 23d is connected through the oil passage 138 to the servo pressure control valve 48 and then via the servo pressure control valve 48 through an oil passage 139 and the oil passage 137 to the ports "a" thereof, on the other hand. The pressure in the release side oil chamber 23d of the 2-4 brake actuator 23A is also fed to the coast control valve 50 through the oil passage 107 and to the forward control valve 51 through the oil passage 107 and the branch oil passage 107a.

SHIFT VALVES 54 AND 56

The 2-3 shift valve 54 regulates a supply or a release of a pilot pressure by turning the 2-3 solenoid 58 on or off. The pilot pressure to be regulated by the 2-3 shift solenoid 58 is determined by supplying an oil pressure from a branch oil passage 137a, as it is, to the 2-3 shift valve 54 or draining the oil pressure, the branch oil passage 137a being branched from the oil passage 137 extending from the ports "a" of the manual valve 41. The oil pressure is drained when the 1-2 solenoid 58 is turned on.

The 1-2 shift valve 56 regulates a supply or a release of a pilot pressure by the 1-2 solenoid 59. As the pilot pressure to be regulated by the 1-2 solenoid 59 is employed a line pressure from the oil passage 140 bypassing the manual valve 41. When the 1-2 solenoid 59 is turned on, the line pressure is drained to release the pilot pressure. The pilot pressure for the 1-2 shift valve 56 also contains a pilot pressure to be regulated for the 2-3 shift valve 54. That is, the pilot pressure regulated by the 2-3 solenoid 58 also acts as a pilot pressure on the 1-2 shift valve 56 through an oil passage 141.

The 1-2 shift valve 56 is operated by the pilot pressures regulated by the solenoids 58 and 59. Given the pilot pressure to be regulated by the 2-3 solenoid 58 being zero, that is, being drained as the 2-3 solenoid 58 is turned on, the 1-2 shift valve 56 is displaced to left in the drawings to communicate the oil passage 137 with the oil passage 136, when the 1-2 solenoid 59 is turned off and the pilot pressure is converted into a line pressure, thus enabling a supply of the line pressure to the apply side oil chamber 23c of the 2-4 brake actuator 23A. On the contrary, when the 2-3 solenoid 58 is turned off and the pilot pressure for the 2-3 shift valve 54 is converted into line pressure, the resulting line pressure acts on the 1-2 shift valve 56 which in turn is displaced to right in the drawings in order to block the oil passages 137 and 136, regardless of ON/OFF operation of the 1-2 solenoid 59.

COAST EXHAUST VALVE 52

As a pilot pressure for the coast exhaust valve 52 is used a pilot pressure regulated by the 1-2 solenoid 59. For this purpose, the pilot pressure regulated by the 1-2 solenoid 59 is fed to the coast exhaust valve 52 through an oil passage 142.

Table 2 below indicates the relationships of the speed range positions and speed stages with states of operation of the solenoid 58 and 59. It is noted herein that both the solenoid valves 58 and 59 can be turned off in the fourth speed stage in the speed range position "D".

TABLE 2

| Speed Ranges And Speed Stages | | 1-2 Solenoid (59) | 2-3 Solenoid (58) |
| --- | --- | --- | --- |
| P | | | O |
| R | | O | |
| N | | | O |
| D | 1ST | | O |
| | 2ND | O | O |
| | 3RD | O | |
| | 4TH | O | |
| 2 | 1ST | | O |
| | 2ND | O | O |
| | 3RD | O | |
| 1 | 1ST | | O |
| | 2ND | O | O |

Note:
The symbol O means that the solenoid is turned on (drained).

LOCK-UP CLUTCH 29

The lock-up clutch 29 is arranged such that it is at a stationary time in a state of being coupled by receiving a pressure from the torque converter 2 and that it is uncoupled when an oil pressure is introduced into the lock-up clutch 29. The lock-up clutch 29 is connected through an oil passage 151 to the lock-up control valve 49 which in turn is communicated through an oil passage 152 with the line pressure passage 101 bypassing the manual valve 41. This structure permits controlling a connection or disconnection of the lock-up clutch 29 or a connection thereof in a halfway state by regulating the pilot pressure of the lock-up control valve 49.

TORQUE CONVERTER 2

The torque converter 2 is communicated through an oil passage 153 with the lock-up control valve 49 which in turn is connected to a converter relief valve 60 through the oil passage 152, thus permitting a pressure in the torque converter 2 to be maintained always constant at the oil passage 152.

OPERATION OF VALVES IN THE OIL PRESSURE CIRCUITS

Shift Valves:

Shifting the speed stages in each of the speed range positions "D", "1" and "2" is effected basically by way of an appropriate ON/OFF operation of the shift valves 58 and 59 as have been indicated in Table 2 above. More specifically, engagement and disengagement of the 2-4 brake 23 is regulated, as shown in Table 1 above, by controlling an application or release of the oil pressure to or from the apply side oil chamber 23c of the actuator 23A for the 2-4 brake 23 by means of the 1-2 shift valve 56 via the 1-2 solenoid 59 or by controlling an application or release of the oil pressure to or from the release side oil chamber 23d thereof by means of the third duty solenoid 45C.

A control of an application or a release of the oil pressure to or from the 3-4 clutch 27 by means of the 2-3 shift valve 54 via the 2-3 solenoid 58 permits a regulation of coupling and uncoupling of the 3-4 clutch 27 as shown in Table 1 above.

Low Reducing Valve 57:

During the speed range position "1", the low reducing valve 57 regulates the oil pressure for coupling the low reducing valve 57 to be maintained at a constant low level.

Reverse Pressure Control Valve 47:

At the time when the speed range is selected from the position "N" to the position "D", the pilot pressure for the reserve pressure control valve 47 is regulated by the second duty solenoid 45B so that the oil pressure for coupling the reverse clutch 24 is regulated to thereby reducing a shock to be caused at that time.

Coast Control Valve 50:

This coast control valve 50 is to ensure a release of the coast clutch 21 during the fourth speed stage. As the pilot pressure for the coast control valve 50 may be used the oil pressure for coupling the 3-4 clutch 27 to be supplied through the oil passage 143 as well as the oil pressure from the release side oil chamber 23d of the 2-4 brake actuator 23A. This arrangement permits the coast control valve 50 to release the oil pressure for coupling the coast clutch 21 by receiving the coupling oil pressure of the 3-4 clutch 27 because the pressure in the release side oil chamber 23d thereof is released during the fourth speed stage where both the 3-4 clutch 27 and the 2-4 brake 23 are coupled. This prevents an internal lock of the planetary gear unit 14, which may be caused in instances where the 3-4 clutch 27 and the 2-4 brake 23 are coupled. Since the oil pressures coupling the 3-4 clutch 27 and the 2-4 brake 23 are employed as the pilot pressure for the coat control valve 50, as have been described hereinabove, an internal lock at the fourth speed stage can be prevented for sure. This arrangement is also effective as a fail safe function for a secure prevention of an internal lock which may otherwise be coused when the solenoids 58 and 59 are both turned off during the fourth speed stage in instances where there is caused a deviation between a transmission signal and an actual state of the speed stage for the reason of sticking of the coast exhaust valve 52 or for other reasons.

Coast Exhaust Valve 52:

A basic engagement and disengagement of the coast exhaust valve 52 is controlled by the pilot pressure regulated by the 1-2 solenoid 59 as indicated in Tables 1 and 2 above.

The coast exhaust valve 52 ensures a prevention of the internal lock that may temporarily occur at a timing of operation of the 3-4 clutch 27 and the 2-4 brake 23 at the time of upshifting from the second speed stage to the third speed stage. While the 2-3 shift solenoid 58 is turned off to convert the pilot pressure into line pressure and the 1-2 shift valve 56 is held at the second speed stage, the coast exhaust valve 52 is turned on to convert the pilot pressure into line pressure by the pilot pressure (line pressure) of the 1-2 solenoid 59, releasing the oil pressure for coupling the coast clutch 21. Of course, this operation works in the midway of upshifting from the second speed stage to the third speed stage. After the upshifting to the 3rd speed stage was finished, the coast clutch 21 is coupled or engaged again by turning the 1-2 solenoid 59 on. A manner of this regulation will be described in detail hereinbelow.

Forward Control Valve 51:

At the time of shifting the speed range from the range "N" to the range "D", the servo pressure control valve 48 is regulated by the third duty solenoid 45C to adjust the oil pressure of the oil passage 107 and the branch oil passage 107a. If the oil pressure of the oil passage 107a does not reach a predetermined oil pressure, on the one hand, the forward control valve 51 is operated to supply an oil pressure to the forward clutch 20 so as to allow the oil passage 107a to reach the predetermined oil pressure. If the oil pressure of the branch oil passage 107a exceeds the predetermined oil pressure, on the other hand, the line pressure from the oil pressure 122 is supplied to the forward clutch 20 as it is. This arrangement reduces a shock at the time of shifting from the speed range "N" to the speed range "D".

3-4 Pressure Control Valve 46:

At the time of upshifting from the second speed stage to the third speed stage, the 3-4 clutch 27 is coupled at an appropriate pressure in order to prevent a transmission shock or a shock caused at the time of shifting the speed stages. This coupling is effected at an appropriate timing of releasing the 2-4 brake 23 by adjusting the pilot pressure by the second duty solenoid 45B.

At the time of downshifting from the third speed stage to the second speed stage, the oil pressure for coupling the 3-4 clutch 27 is released at an appropriate timing of coupling or engaging the 2-4 brake 23 by regulating the pilot pressure by means of the second duty solenoid 45B in order to prevent a shock to be caused at the time of the downshifting.

Servo Pressure Control Valve 48:

Regulation of the pilot pressure by means of the third duty solenoid 45C permits an adjustment of the oil pressure in the release side oil chamber 23d of the actuator 23A for the 2-4 brake 23 and an adjustment of the oil pressure for coupling the forward clutch 20. The above description on the forward control valve 51 in this section of the specification is incorporated as reference hereto.

When the speed stage is upshifted from the first speed stage to the second speed stage, the oil pressure for coupling is supplied to the apply side oil chamber 23c in the 2-4 brake actuator 23A by the 1-2 shift valve 56. At this time, a transmission shock can be reduced by an adjustment of the oil pressure in the release side oil chamber 23d thereof.

At the time of upshifting from the second speed stage to the third speed stage, the oil pressure for releasing is eventually fed to the release side oil chamber 23d of the 2-4 brake actuator 23A at a timing of coupling or engaging the 3-4 clutch 27 while adjusting the pressure in the release side oil chamber 23d thereof. This prevents a shock that may be caused at the time of upshifting from the second to the third speed stage. That is, although the oil pressure for coupling is supplied to the apply side oil chamber 23c thereof at both the second and third speed stages, the coupling or engagement and the uncoupling or disengagement of the 2-4 brake 23A is switched by shifting a supply and a release of the oil pressure to and from the release side oil chamber 23d thereof. Regulating the oil pressure to be fed to the release side oil chamber 23d thereof by the servo pressure control valve 48 permits a gradual engagement of the 2-4 brake 23, thus preventing a transmission shock which otherwise may be caused at the time of shifting the speed stages.

At the time of downshifting from the third speed stage to the second speed stage, while the oil pressure in the release side oil chamber 23d is adjusted, the oil pressure is eventually released to engage the 2-4 brake 23 at an appropriate timing of releasing the 3-4 clutch 27.

CONTROL AT THE TIME OF SHIFTING:

At the time of shifting between the second speed stage and the third speed stage, the 3-4 clutch 27 and the 2-4 clutch 23 are shifted between a coupled or engaged state and an uncoupled or disengaged state. At this time, shifting the speed stages is conveniently effected via a temporary state of the first speed stage as the lowest speed stage while the coast clutch 21 is uncoupled or disengaged. This can effectively prevent a transmission shock that might be caused at that time.

This will be set forth more in detail on condition that the coast clutch 21 is coupled in the course of shifting between the second speed stage and the third speed stage. At the time of downshifting from the third speed stage to the second stage, on the one hand, the fourth speed stage is temporarily established causing a shock on account of an internal lock if the timing of coupling the 2-4 brake 23 were too early. When the upshifting from the second speed stage to the third speed stage is in the progress, on the other hand, if the timing of coupling the 3-4 clutch 27 were too early, the fourth speed stage is temporarily established in this case, too, causing a shock to arise from an internal lock. Accordingly, if the coast clutch 21 were uncoupled at the time of shifting between the second and third speed stages prior to the coupling or uncoupling of the 2-4 brake 23 and the 3-4 clutch 27, a shock on account of such an internal shock can be effectively prevented.

Even if the coast clutch 21 were disengaged during the time of shifting between the second and third speed stages, a temporary state of the 4th speed stage as have been set forth hereinabove could be caused to arise. In this case, no shock will be caused on account of an internal lock because of the disengagement of the coast clutch 21, but there is the possibility that a shock could be caused to occur by engine braking. This is because, when the fourth speed stage is established temporarily, the number of revolutions on the engine side, viz., on the side of the turbine shaft 13 as an input shaft of the automatic transmission becomes extremely larger than that on the drive shaft side, viz., on the side of the output shaft 28, so that an engine braking action develops, reducing the number of revolutions on the engine side, thus causing a shock. Such an engine braking action can be prevented if a state of the first speed stage could be established in order to take the reverse relationship as performed by the fourth speed stage, that is, in such a manner as the number of revolutions on the input shaft side being smaller than that on the output shaft side.

A detailed description on the control at the shifting between the second speed stage and the third speed stage will be made with reference to the flowcharts indicated in FIGS. 3 and 4. In the following description, symbol "P" denotes a step. Although a transmission control is designed to be made by means of a microcomputer in this embodiment, it is known to use such a microcomputer for controlling the shifting of the speed stages so that a description on a system for the transmission control will be omitted below.

Figure 3:
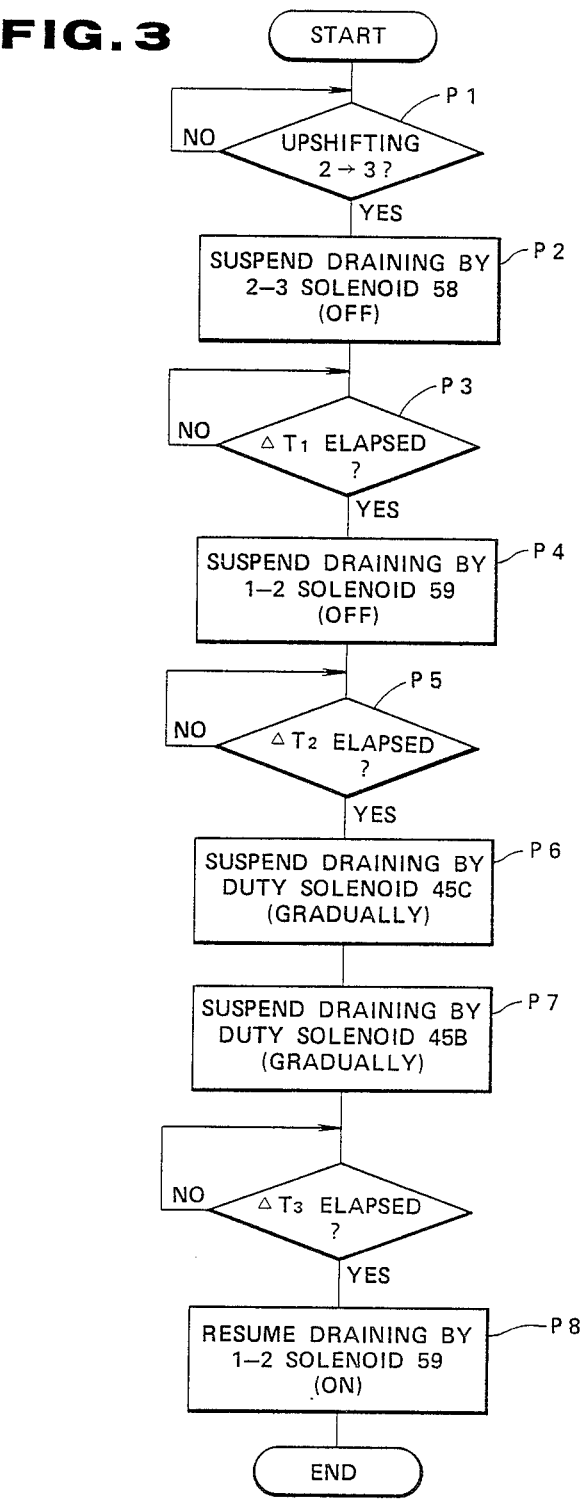

FIG. 3 indicates an instance of upshifting from the second speed stage to the third speed stage. In P1, it is discriminated whether or not the upshifting from the second speed stage to the third speed stage should be effected. If NO in P1, the flow returns and, if YES, the 2-3 solenoid 58 is turned off in P2 to suspend the draining by the 2-3 solenoid 58.

In P3, it is discriminated whether or not a predetermined period of time ΔT1 is elasped after the drain was suspended in P2. This discrimination in P3 is to ensure a state in which the shift valve 54 is retained at a position fixed in a leftward direction in FIG. 2 and the shift valve 56 is retained at a position fixed in a rightward direction. If NO in P3, this discrimation is repeated as it is and, if YES, the 1-2 solenoid 59 is turned off in P4 to suspend the drain by the 1-2 solenoid 59. It is then discriminated in P5 whether or not a predetermined period of time ΔT2 is elasped after the treatment in P4 was finished. This discrimination at P5 is to ensure a state of retaining the coast exhaust valve 52 at a position fixed in the leftward direction in FIG. 2, whereby the disengagement or uncoupling of the coast clutch 21 becomes ensured. If NO at P5, this discrimination is repeated as it was and, if YES, the flow advances to P6.

In P6, the draining by the third duty solenoid 45C is gradually suspended so that the oil pressure in the release side oil chamber 23d of the actuator 23A for the 2-4 brake 23 is gradually raised, thus releasing the coupling of the 2-4 brake 23 gradually. Thereafter, the flow proceeds to P7 in which the drain by the second duty solenoid 45B is gradually suspended, thereby coupling or engaging the 3-4 clutch 27 in a gradual manner.

At this time, with the relationship of the order of regulating the steps P6 and P7 under consideration, the 2-4 brake 23 and the 3-4 clutch 27 are both uncoupled and turned into a temporary state of the 1st speed stage. In this case, a manner of supplying the oil pressure to the apply side oil chamber 23c and the release side oil chamber 23d in the actuator 23A for the 2-4 brake 23 is different from the case shown in Table 1 above.

The flow then advances to P8 and it is discriminated therein whether or not a predetermined period of time ΔT4 has elasped in order to provide a time sufficient for allowing the 3-4 clutch 27 to be fully coupled and the 2-4 brake 23 to be fully uncoupled. Accordingly, if the discrimination at P8 is NO, this discrimination is repeated and, if YES, the flow proceeds to P9 and the draining by the 1-2 solenoid 59 is resumed to couple the coast clutch 21 again. This concludes the upshifting from the second speed stage to the third speed stage.

FIG. 4 indicates an instance of downshifting from the third speed stage to the second speed stage. The basic treatment is substantially the same as in FIG. 3. In P11, it is discriminated whether or not the current timing is appropriate for effecting the downshifting from the third speed stage to the second speed stage. If NO in P11, the flow returns to repeat this discrimination at P11 and, if YES, the flow proceeds to P12 and the drain of the 1-2 solenoid 59 is suspended thereby permitting the disengagement of the coast clutch 21. It is then confirmed in P13 whether there has been elapsed a predetermined period of time ΔT2 sufficient for allowing the coast clutch 21 to be uncoupled. The flow then proceeds to P14.

In P14, the draining by the second duty solenoid 45B is commenced gradually to release the coupling of the 3-4 clutch 27. The flow then proceeds to P15 and the draining by the third duty solenoid 45C is gradually commenced to release the oil pressure for releasing the coupling or engagement of the 2-4 brake 23 in a gradual manner. At this time, a temporary state of the first speed stage is established from the relationship of P14 with P15. Thereafter, it is discriminated at P16 whether a predetermined period of time ΔT4 has passed in order to provide a time enough to allow the oil pressure for releasing the coupling of the 2-4 brake 23 to be fully released. At P17, the draining by the 1-2 solenoid 59 is then resumed (engagement of the coast clutch 21 is resumed) and then a predetermined period of time ΔT5 is allowed to pass at P18. Then, at P19, the draining by the 2-3 solenoid 58 is effected and the 3-4 clutch 27 is uncoupled. This concludes the downshifting from the third speed stage to the second speed stage.

VARIANTS

FIG. 5 illustrates one of variants in the oil pressure circuits according to the present invention. In this embodiment, as shown in FIG. 5, the oil pressure circuit for the coast clutch 21 is modified from that as shown in FIG. 1.

Referring back to FIG. 2, the passage between the manual valve 41 and the coast exhaust valve 52 in the operating oil pressure supply passage for engaging or coupling the coast clutch 21 is shown to be composed of the oil passage 126 extending from the ports "c" of the manual valve 41. The oil passage 127 bypassing the coast exhaust valve 52 and the shifting valve 53 are further disposed in the embodiment as shown in FIG. 2.

Turning now to FIG. 5, the passage between the manual valve 41 and the coast exhaust valve 52 is shown to be composed of an oil passage 137 extending from the ports "a" of the manual valve 41 and a branch oil passage 137b branched from the oil passage 137. In the oil pressure circuit as shown in FIG. 5, the shifting valve 53 is not mounted, and the oil pressure in the oil passage 127 is arranged so as to allow the oil pressure therein to act on the coast exhaust valve 52 as a pilot pressure. The coast exhaust valve 52 which has received the pilot pressure from the oil passage 127 is energized in a direction in which the operating oil pressure from the branch oil passage 137b can be supplied to the coast clutch 21. At the speed range "1", the ports "e" of the manual valve 41 are communicated with the ports "g" thereof for supplying the line pressure, while at the speed ranges "2" and "D", the ports "g" are blocked as have been described in this respect on the manual valve 41 above. Accordingly, as shown in Table 1 above, even at first speed stage, the engagement of the coast clutch 21 is ensured in the speed range "1" while there is formed a state in which the coast clutch 21 is not coupled or engaged in the speed ranges "D" and "2". More specifically, the coast exhaust valve 52 is shifted to a state in which the oil pressure can be supplied for engaging the coast clutch 21 by receiving the pilot pressure controlled by the solenoid 59 for the 1-2 shift valve 56 at the second and third speed stages in the speed ranges "D" and "2" and at the second speed stage in the speed range "1". On top of this, the coast exhaust valve 52 is shifted to a state in which the oil pressure can be fed for engaging or coupling the coast clutch 21 by receiving the original pressure from the ports "e" of the manual valve 41 as pilot pressure at the first speed stage in the speed range "1".

The structure of the oil pressure circuits as shown in FIG. 5 has one of the advantages that the shifting valve 53 can be removed. Another advantage resides in that the operating oil pressure supply passage for the coast clutch 21 can be reduced to only one in common. This prevents a deviation in timings of operation of the coast clutch 21 compared with the case where the operating oil pressure is selectively supplied from different passages. A further advantage is in that the above two advantages can be gained without large modifications on a whole structure of the oil pressure circuit.

It is to be understood that the foregoing text and drawings relate to embodiments of the present invention given by way of examples but not limitation. Various other embodiments are possible within the spirit and scope of the present invention.

What is claimed is:

1. An oil pressure circuit comprising:
   a multistage transmission gear mechanism having a shifting speed stage representing a ratio of rotation of an output shaft to rotation of an input shaft, said shifting stage being adapted to provide at least four speed stages from first speed stage to fourth speed stage;
   a first coupling means and a second coupling means being each of a type operable hydraulically and being adapted to shift a power transmission passage of said multistage transmission gear mechanism, said first coupling means being arranged so as to be shifted between a coupled or engaged state and an uncoupled or disengaged state between first and second speed stages and third and fourth speed stages, said second coupling means being arranged so as to be shifted between a coupled or engaged state and an uncoupled or disengaged state between first and third speed stages and second and fourth speed stages, and said four speed stages being alternatively selected in accordance with a combination of the coupled state and the uncoupled state of said first and second coupling means;
   a third coupling means being of a type operable hydraulically and capable of transmitting a torque in a reverse direction toward the side of said input shaft from the side of said output shaft at least at second and third speed stages;
   a first actuator containing a first solenoid adapted to generate a first pilot pressure shifting a state between the first speed stage and the second, third and fourth speed stages, said first actuator being adapted to regulate a supply of operating oil pressure to said second coupling means in accordance with a state in which said first pilot pressure is generated;
   a second actuator containing a second solenoid adapted to generate a second pilot pressure shifting a state between the first and second speed stages and the third and fourth speed stages, said second actuator being adapted to regulate a supply of operating oil pressure to said first coupling means in accordance with a state in which said second pilot pressure is generated;
   a third actuator containing a third solenoid adapted to generate a third pilot pressure, said third actuator adapted to allow said third pilot pressure to cancel a regulation of said second coupling means by said first actuator at third speed stage; and
   at the time of shifting between second and third speed stages, said second pilot pressure being set to act on said first actuator and prevail over said first pilot pressure so as to retain and fix said first actuator in a state at second, third and fourth speed stages and said first pilot pressure being adapted so as to regulate shifting said third coupling means.

2. An oil pressure circuit as claimed in claim 1, in which said third coupling means is arranged so as to suppress transmitting a torque in said reverse direction at the time of shifting between the second speed stage and the third speed stage during a period of time when each of said first and second coupling means is shifted between the coupled state and the uncoupled state.

3. An oil pressure circuit as claimed in claim 2, in which said second actuator is provided with a pressure regulating function for adjusting a force of coupling or engaging said first coupling means by regulating operating oil pressure to be supplied to said first coupling means; and
   said third actuator is provided with a pressure regulating function for adjusting a force of coupling or engaging said second coupling means by regulating operating oil pressure for cancelling the regulation of said second coupling means.

4. An oil pressure circuit as claimed in claim 2, in which each of said first and second coupling means is arranged so as to be shifted between the coupled state and the uncoupled state at the time of shifting between the second speed stage and the third speed stage via a state in which the shifting speed stage temporarily becomes the lowest-speed stage.

5. An oil pressure circuit as claimed in claim 1, in which the shifting speed stage is set as first, second, third and fourth speed stages in this order from the low-speed stage side to the high-speed stage side; and
   said third coupling means is arranged so as to effect switching between a transmission of the torque in said reverse direction and a suspension of the transmission thereof among the shifting speed stages of the first, second and third speed stages.

6. An oil pressure circuit as claimed in claim 1, in which said first coupling means is set so as to become in the uncoupled state at the first and second speed stages and in the coupled state at the third and fourth speed stages;

said second coupling means is set so as to become in the uncoupled state at the first and third speed stages and in the coupled state at the second and fourth speed stages; and said third coupling means is set so as to become in the uncoupled state at the first speed stage and in the coupled state at the second and third speed stages and to suppress transmitting the torque in said reverse direction at the time of being in the uncoupled state.

7. An oil pressure circuit as claimed in claim 6, in which said first solenoid is arranged so as to generate said first pilot pressure for supplying operating oil pressure to said second coupling means for coupling said second coupling means at the second, third and fourth speed stages and for suppressing the supply of the operating oil pressure to said second coupling means at the first speed stage; and said third solenoid is arranged so as to generate said third pilot pressure for supplying operating oil pressure to said second coupling means for uncoupling or disengaging said second coupling means at the third speed stage and for supressing the supplying of the operating oil pressure therefor at the second and fourth speed stages.

8. An oil pressure circuit as claimed in claim 1, further comprising:

a selection means for selecting at least two speed ranges by shifting a manner capable of supplying operating oil pressure to each of said first, second and third coupling means, said selection means being operable manually and said two speed ranges comprising a first speed range capable of selecting plural shifting speed stages and a second speed range capable of selecting a shifting speed stage or stages less than said first speed range;

said first and second actuators being connected to an oil pressure supply passage to which operating oil pressure is supplied through said selection means in an instance where said selection means is at either of the second and third speed stages; and operating oil pressure from an oil pressure supply passage being used as pilot pressure for shifting between the coupled state and the uncoupled state of said third coupling means, said operating oil pressure being not supplied when said selection means selects said first speed range and being supplied when said selection means selects said second speed range.

9. An oil pressure circuit as claimed in claim 8, in which said operating oil pressure to be supplied through said selection means only when said selection means selects said second speed range is used as pilot pressure which brings said third coupling means into the coupled state and allows a torque to be transmitted in said reverse direction.

10. An oil pressure circuit as claimed in claim 9, in which a shifting valve is connected to the operating oil pressure supply passage supplying to said third coupling means the operating oil pressure for coupling said third coupling means; and said operating oil pressure to be supplied through said selection means only when said selection means selects said second speed range is used as pilot pressure for said shifting valve.

11. An oil pressure circuit as claimed in claim 8, in which the shifting speed stage is set as first, second, third and fourth speed stages in the order from the low-speed stage side to the high-speed stage side;

said first speed range is set as two ranges, one range being for automatically selecting four shifting speed stages from first speed stage to fourth speed stage, inclusive, and the other range being for automatically selecting three shifting speed stages from first speed stage to third speed stage, inclusive,; and said second speed range is set as only one range for automatically selecting two shifting speed stages of first and second speed stages.

12. An oil pressure circuit as claimed in claim 1, in which said shifting speed stage is set as first, second, third and fourth speed stages in the order from the low-speed stage side to the high-speed stage side;

said first coupling means is adapted to be coupled when operating oil pressure is supplied;

said second coupling means is adapted to be coupled only when operating oil pressure for coupling is supplied and operating oil pressure for uncoupling is released;

said third coupling means is of a type adapted to be coupled when operating oil pressure is supplied and capable of transmitting a torque in said reverse direction when said third coupling means is coupled;

said first actuator contains a first shift valve connected to an operating oil pressure supply passage for supplying to said second coupling means said operating oil pressure for coupling said second coupling means, said first shift valve being capable of shifting a passage of the operating oil pressure for supplying or for suppressing a supply of the operating oil pressure, said first pilot pressure by said first solenoid being arranged so as to act on said first shift valve and said second pilot pressure by said second solenoid to prevail over said first pilot pressure and act on said first shift valve;

said second actuator contains a second shift valve connected to an operating oil passage supply passage for said first coupling means, said second shift valve being capable of shifting a passage of operating oil pressure for supplying or for suppressing a supply of the operating oil pressure, and said pilot pressure by said second solenoid being arranged so as to act on said second shift valve;

said third actuator contains a first shifting valve connected to an operating oil supply passage for uncoupling said second shifting means, said first shifting valve being capable of shifting a passage of operating oil pressure for supplying or for suppressing a supply thereof, and said pilot pressure by said third solenoid being arranged so as to act on said first shifting valve; and a second shifting valve is connected to an operating oil pressure supply passage for said third coupling means, said second shifting valve being arranged so as to shift a passage of operating oil pressure for supplying the operating oil pressure or for suppressing a supply thereof for said third coupling means.

13. An oil pressure circuit as claimed in claim 12, in which said first coupling means is brought into a coupled state at the third and fourth speed stages and into an uncoupled state at the first and second speed stages;

said second coupling means is brought into a coupled state at the second and fourth speed stages and into an uncoupled state at the first and third speed stages; and said third coupling means is brought into an uncoupled state at the fourth speed stage and suppresses a torque transmission in said reverse direction.

14. An oil pressure circuit as claimed in claim 13, in which a third shifting valve is additionally connected in series with said second shift valve to the operating oil pressure supply passage for said first coupling means, said third shifting valve being adapted so as to shift a passage of operating oil pressure for supplying to said first coupling means or suppressing a supply thereof in accordance with to a fourth pilot pressure to be generated by a fourth solenoid.

15. An oil pressure circuit as claimed in claim 14, in which said third and fourth solenoids each are a duty solenoid.

* * * * *